United States Patent [19]
Bell

[11] Patent Number: 5,142,821
[45] Date of Patent: Sep. 1, 1992

[54] REUSABLE TREE/SHRUB CARRIER

[76] Inventor: Leslie E. Bell, 2414 Lynwood St., Morris, Ill. 60450

[21] Appl. No.: 732,161

[22] Filed: Jul. 18, 1991

[51] Int. Cl.$^5$ .............................................. A01G 9/02
[52] U.S. Cl. ............................................. 47/76; 47/73
[58] Field of Search ................. 47/66, 73 X, 76, 77, 47/84–87

[56] References Cited

U.S. PATENT DOCUMENTS

| | | | |
|---|---|---|---|
| D. 226,279 | 2/1973 | Eyerly | 47/73 |
| 712,269 | 2/1952 | Sax | 47/73 |
| 2,319,081 | 5/1943 | Neeper | 47/73 |
| 2,707,846 | 3/1951 | Beseler | 47/76 |
| 2,792,142 | 5/1957 | Sandkuhle | 47/73 |
| 3,662,490 | 5/1972 | Childs . | |
| 3,782,773 | 1/1974 | Mason | 47/76 |
| 3,936,960 | 2/1976 | Clegg . | |
| 4,062,148 | 12/1977 | Edmonds, Jr. et al. . | |
| 4,287,840 | 9/1981 | . | |
| 4,325,202 | 4/1982 | Liard | 47/73 |
| 4,402,148 | 9/1983 | Schiffelbein . | |
| 4,604,017 | 8/1986 | Boehm . | |
| 4,604,825 | 8/1986 | Mainprice . | |

Primary Examiner—David A. Scherbel
Assistant Examiner—Michele A. Van Patten
Attorney, Agent, or Firm—Wood, Phillips, VanSanten, Hoffman & Ertel

[57] ABSTRACT

In order to reduce labor costs, enhance handling convenience, and encourage resource reutilization, a reusable tree-shrub carrier is disclosed. The carrier includes a plurality of side wall sections each configured so as to be arranged into a root ball container. Each of the side wall sections is substantially identical in shape and has an edge to be placed in juxtaposition to an edge of an adjacent one of the side wall sections such that the container has at least one open end. the carrier also includes a plurality of corner locking channels for releasably securing the edges of the side wall sections and retention strap assemblies for releasably securing a root ball during carrier transport.

13 Claims, 1 Drawing Sheet reusable tree/shrub carrier

FIELD OF THE INVENTION

The present invention relates in general to apparatus for moving trees, shrubs and bushes and, more particularly, a reusable tree/shrub carrier for more effectively transplanting trees, shrubs and bushes.

BACKGROUND OF THE INVENTION

As will be appreciated by those skilled in the art, there are many different devices which are available for the transplantation of trees, shrubs and bushes. For instance, there are tree spades such as those manufactured by the Vermeer Manufacturing Company which form a root ball in the process of digging the tree, shrub or bush out of the ground, and a variety of similar devices have been disclosed in Clegg U.S. Pat. No. 3,936,960, issued Feb. 10, 1976, Schiffelbein U.S. Pat. No. 4,402,148, issued Sep. 6, 1983, and Boehm U.S. Pat. No. 4,604,017, issued Aug. 5, 1986. In addition to tree spades as disclosed in these patents, there have been many different devices proposed for carrying a root ball during transport of a tree, shrub, etc.

By way of example, Edmonds, Jr., et al. U.S. Pat. No. 4,062,148, issued Dec. 13, 1977, proposes a wire basket to hold a root ball. There has also been proposed a tree cradle as disclosed in Mainprice U.S. Pat. No. 4,604,825, issued Aug. 12, 1986 as well as a semi-cylindrical shell arrangement as disclosed in Childs U.S. Pat. No. 3,662,490, issued May 16, 1972. Unfortunately, none of these devices have fully addressed the various considerations for transplanting trees, shrubs and bushes.

More specifically, the wire baskets obviously involve a waste of natural resources. This technique usually involves leaving the wire basket in the ground once a tree, shrub or bush has been transplanted or, alternatively, the wire basket is simply discarded. In either event, the result is incompatible with concerns as to the environment.

In addition, it is well known that wire baskets and tree cradles sometimes fail to sufficiently contain the root ball. It is possible and, in fact, likely in very dry conditions and with certain soil types, that the root ball will break away dangerously exposing roots of a tree, shrub or bush during transport which is naturally a most undesirable circumstance. For these reasons, wire baskets and tree cradles, while oftentimes used, are known to be less than entirely satisfactory.

As for other apparatus, there has been very little in the way of positive improvements over these earlier proposals. It is simply the case that previously proposed devices fail to address concerns such as reducing labor, enhancing handling convenience, and promoting reusability as well as recycling of existing materials. For all of these reasons, it has remained to further develop the art as to carriers for transporting trees, shrubs and bushes.

The present invention is directed to overcoming one or more of the foregoing problems and achieving one or more of the resulting objects.

SUMMARY OF THE INVENTION

Accordingly, it is a principal object of the present invention to provide a reusable tree/shrub carrier. It is a further object of the present invention to provide such a carrier which reduces labor while enhancing handling convenience. Additionally, it is an object of the present invention to encourage reuse and utilize recycled materials.

As a result, the present invention is directed to a reusable tree/shrub carrier comprising a plurality of side wall sections each configured so as to be arranged into a root ball container. Each of the side wall sections is substantially identical in shape and has an edge to be placed in juxtaposition to an edge of an adjacent one of the side wall sections such that the container has at least one open end. Further, the reusable tree/shrub carrier includes side wall section edge securing means and root ball securing means releasably securing a root ball within the root ball container during transport.

More specifically, the reusable tree/shrub carrier includes means for releasably securing the edges of the side wall sections together to form the root ball container. The edge securing means preferably includes a plurality of substantially identical corner locking channels which are each configured to accommodate sliding engagement with as well as interlocking retention of the edges of the side wall sections. In a highly preferred embodiment, the corner locking channels each include a handle at one end for sliding engagement and disengagement with the edges of the side wall sections.

Still additionally, the reusable tree/shrub carrier includes means for releasably securing a tree/shrub root ball within the root ball container during carrier transport operatively associated with both an open top and a smaller open bottom of the root ball container. The ball securing means advantageously includes at least a pair of retention strap assemblies operatively associated with the open top and at least one retention strap assembly operatively associated with the open bottom. In a highly preferred embodiment, the retention strap assemblies each include a strap mount associated with one of the side wall sections and a strap retainer associated with another of the side wall sections to be positioned directly opposite thereof.

As for additional details, the reusable tree/shrub carrier includes the side wall sections preferably being generally planar and trapezoidal shaped such that, when arranged, the side wall sections define a generally continuous container wall formed of a rigid material. Specifically, the root ball container is preferably shaped as a generally truncated pyramid wherein the root ball container has a generally square-shaped open top and a smaller generally square-shaped open bottom. In a most highly preferred embodiment, the side wall sections include four substantially identical sections each having a top edge formed to include a lifting rail configured for cooperation with an external lifting device.

In the exemplary embodiment, the strap mounts each have one end of a strap permanently secured thereto and the strap retainers each are adapted to releasably grip one of the straps at a point remote from the permanently secured strap end. The one pair of retention strap assemblies operatively associated with the square open top each preferably have a strap to be extended across the square open top over the root ball in spaced parallel relation in a first direction. Another pair of retention strap assemblies is advantageously operatively associated with the square open top with each having a strap to be extended across the square open top over the root ball in spaced parallel relation in a second direction. The one retention strap assembly operatively associated with the square open bottom of the root ball container also preferably has a strap to be extended across the square open bottom under the root ball in a first direction. Another retention strap assembly is advantageously operatively associated with the square open bottom of the root ball container having a strap to be extended across the square open bottom under the root ball in a second direction. As for additional details, the lifting rails are each preferably open to facilitate insertion and removal of an external lifting device and each preferably includes a corner locking channel retainer thereon.

Other objects, advantages and features of the present invention will become apparent from a consideration of the following specification taken in conjunction with the accompanying drawings.

DETAILED DESCRIPTION OF THE PREFERRED EMBODIMENT

Figure 1:
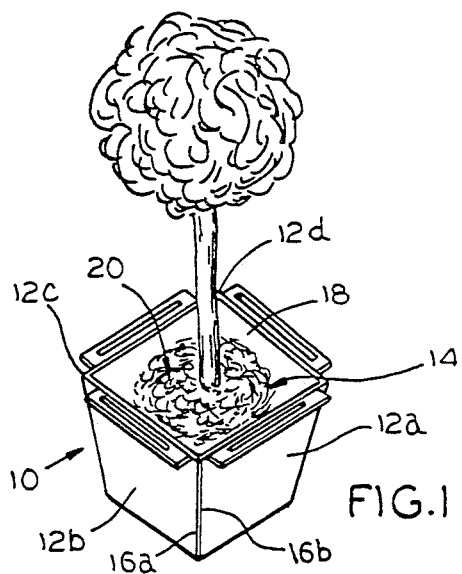
FIG. 1 is a perspective view of a reusable tree/shrub carrier with a tree positioned therein.

In the illustration given, and with reference first to FIG. 1, the reference numeral 10 designates generally a reusable tree/shrub carrier in accordance with the present invention. The carrier 10 includes a plurality of side walls 12a, 12b, 12c, etc. each configured so as to be arranged into a root ball container 14. Each of the side wall sections 12a, 12b, 12c, etc. is substantially identical in shape and has a side edge 16a to be placed in juxtaposition to an edge 16b of an adjacent one of the side wall sections such that the container 14 has at least one open end 18. The carrier 10 also includes means for releasably securing the edges 16a, 16b of the side wall sections to form the root ball container 14 and means for releasably securing a tree/shrub root ball 20 within the root ball container 14 during carrier transport. With this basic arrangement, the present invention has succeeded in providing a unique reusable tree/shrub carrier 10 capable of reducing labor costs, enhancing handling convenience, and promoting reusability and recycling.

Figure 2:
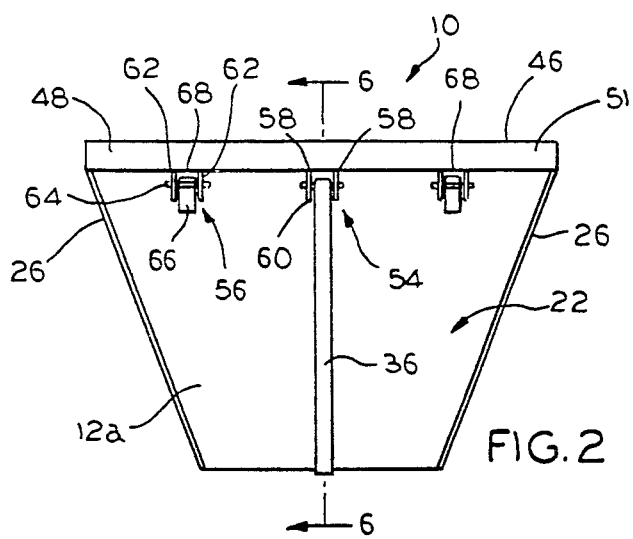
FIG. 2 is a front elevational view of the reusable tree/shrub carrier of FIG. 1.
Figure 3:
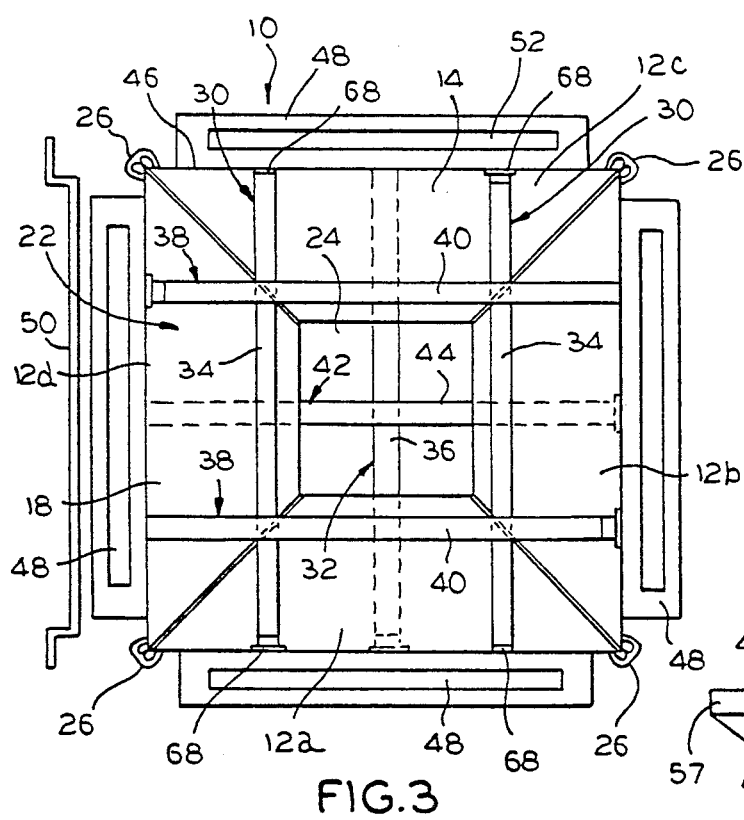
FIG. 3 is a top plan view of the reusable tree/shrub carrier of FIG. 1.

As will be appreciated from FIG. 3, the reusable tree/shrub carrier 10 preferably includes four side wall sections 12a, 12b, 12c, 12d each of which is generally planar and trapezoidal shaped to define a generally continuous container wall 22 formed of a rigid material. This rigid material may advantageously be recycled plastic which, as will be appreciated, will serve to preserve natural resources even further considering that the carrier 10, once formed, is reusable repeatedly for its intended purpose. As will be appreciated from FIG. 2, the reusable tree/shrub carrier 10 is such that the root ball container 14 is generally shaped as a truncated pyramid having a square open top 18 as well as a smaller square open bottom 24.

Figure 4:
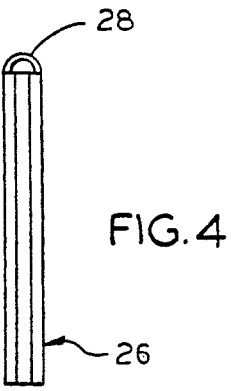
FIG. 4 is a front elevational view of a corner locking channel for the carrier of FIG. 1.
Figure 5:
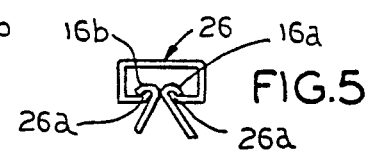
FIG. 5 is a cross-sectional view taken on the line 5—5 of FIG. 1.

As best shown in FIGS. 4 and 5, the edge securing means preferably includes a plurality of substantially identical corner locking channels 26 configured for sliding engagement with and interlocking retention of the side edges 16a, 16b of the side wall sections 12a, 12b, 12c, 12d. The corner locking channels 26 each advantageously include a handle 28 at one end thereof for sliding engagement and disengagement with the side edges 16a, 16b of the side wall sections 12a, 12b, 12c, 12d for easy assembly and disassembly of the root ball container 14. As will be appreciated by those skilled in the art, the side edges 16a and 16b are correspondingly configured for interlocking engagement with inwardly directed flanges 26a and 26b of the corner locking channels 26 substantially as shown.

As previously suggested, the reusable tree/shrub carrier 10 includes means for releasably securing a root ball 20 within the root ball container 14 during carrier transport wherein the securing means is operatively associated with both the square open top 18 and the smaller square open bottom 24 of the root ball container 14. The ball securing means advantageously includes at least a pair of retention strap assemblies generally designated 30 operatively associated with the square open top 18 and at least one retention strap assembly 32 operatively associated with the square open bottom 24 of the root ball container 14. The pair of retention strap assemblies 30, as shown, each have a strap 34 to be extended across the square open top 18 over the root ball 20 in spaced parallel relation in a first direction. As also shown in FIG. 3, the retention strap assembly 32 has a strap 36 to be extended across the square open bottom 24 under the root ball 20 in a first direction whereby the respective straps 34 and 36 cooperatively serve to releasably retain the root ball 20 within the root ball container 14 during transport.

In the most highly preferred embodiment, the carrier 10 includes another pair of retention strap assemblies 38 operatively associated with the square open top 18 each having a strap 40 to be extended across the square open top 18 over the root ball 20 in spaced parallel relation in a second direction, i.e., perpendicular to the direction of the straps 34. In like fashion, the carrier 10 advantageously includes another retention strap assembly 42 operatively associated with the square open bottom 24 of the root ball container 14 having a strap 44 to be extended across the square open bottom 24 under the root ball 20 in a second direction, i.e., perpendicular to the direction of the strap 36.

Figure 6:
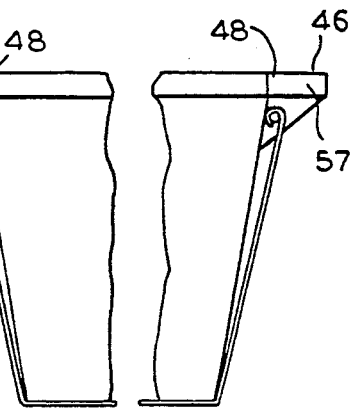
FIG. 6 is a cross-sectional view taken on the line 6—6 of FIG. 2.

Referring to FIG. 6, the reusable tree/shrub carrier 10 also preferably is formed such that each of the side wall sections 12a, 12b, 12c, 12d has a top edge 46 configured as a lifting rail 48 cooperable with an external lifting device 50 (see FIG. 3). The lifting rails 48 are each open as at 51 to facilitate insertion and removal of the external lifting device 50 which, as illustrated, may comprise a lifting rod but, for larger trees, shrubs and bushes, may comprise the tines of a forklift truck or the forks on a tractor loader. As best shown in FIG. 3, the lifting rails 48 also each include a corner locking channel retainer 52 thereon with each of the corner locking channels 26 being configured for sliding engagement with and frictional retention on one of the retainers 52.

As for the retention strap assemblies such as 30, 32, 38 and 42, they each include a strap mount such as 54 (see FIG. 2) associated with one of the side wall sections 12a, 12b, 12c, 12d and a strap retainer such as 56 (see FIG. 2) associated with another of the side wall sections 12a, 12b, 12c, 12d to be positioned directly opposite thereof. It will be appreciated that, in the illustrated embodiment, there will be one pair of side walls such as 12a and 12b with a single strap mount 54 centrally positioned under the lifting rail 48 with a pair of strap retainers 56 on either side thereof and that there will be another pair of side walls 12c and 12d with just the reverse arrangement, i.e., a single strap retainer 56 centrally positioned between a pair of strap mounts 54 on either side thereof. With this arrangement, the strap mounts 54 each have one end of a strap such as 34, 36, 40 and 44 permanently secured thereto with the strap retainers 56 each being adapted to releasably grip one of the straps such as 34, 36, 40 and 44 at a point remote from the permanently secured end thereof.

As will be appreciated by comparing FIGS. 2 and 6, the strap mounts 54 may suitably comprise a pair of ribs 58 mounted to the corresponding side wall and to the underside of the corresponding channel wherein a pin 60 may extend through suitable holes in the ribs 58. It will be appreciated that the pin 60 will also extend through a suitable loop in the permanently secured end of the corresponding strap and will be cooperatively retained by any suitable means such as a cotter key or the like. As for the strap retainers 56, they may have a similar construction, i.e., a pair of ribs 62 may be mounted in like fashion to the ribs 58 with a pin 64 supporting a frictional strap retention mechanism 66 similar to the pin 60 that is utilized in connection with the strap mount 54.

As for the frictional strap retention mechanism 66, it may suitably take the form of a conventional belt tightener such as those long utilized on seat belts and in other similar applications. It will also be appreciated that the side wall sections 12a, 12b, 12c, 12d may have suitable slots 68 which are just under the lifting rails 48 and between the ribs 62. As for the slots 68 in the side wall sections 12a, 12b, 12c, 12d, they will be at or near the top of the root ball 20 but need only be provided for the retention strap assemblies 30 and 38 associated with the open top 18.

As for the reusable tree/shrub carrier 10, it can be constructed from recycled plastic thereby making use of plastic collected for recycling purposes. It will also be appreciated that the carrier 10 can be formed to accommodate the various size tree digging spades currently in use by forming the components in various sizes. By so doing, the reusable tree/shrub carrier 10 greatly facilitates handling convenience for most all sizes of trees, shrubs and bushes.

In this connection, handling convenience is enhanced by the channels provided for lifting by means of a forklift truck or the forks on a tractor loader or with separate lifting bars in the case of smaller trees, shrubs and bushes. Of importance, the tree, shrub or bush can be carried to a new location either in an upright position on the forklift truck or forks on a tractor loader or lifting bars, or it can be reclined on a truck or trailer for longer distance transport.

Once the tree, shrub or bush reaches a new location, it may simply be placed into a hole and the reusable tree/shrub carrier 10 disassembled below ground level. This may be accomplished by releasing the various straps 34, 36, 40 and 44, pulling on the handles 28 of the corner locking channels 26 to slidably remove them from the edges 16a, 16b of the side wall sections 12a, 12b, 12c, 12d, following which the various sections of the carrier 10 can be pulled from the ground leaving the root ball in the hole ready to complete the transplantation thereof. Thereafter, the carrier 10 may be reused repeatedly to transport and transplant yet another tree, shrub or bush in like fashion as needed.

As used throughout, the term "tree/shrub" shall be understood as meaning a tree, shrub, bush, or other like item.

While in the foregoing there has been set forth a preferred embodiment of the invention, it will be understood that the details herein given may be varied by those skilled in the art without departing from the true spirit and scope of the appended claims.

I claim:

1. A reusable tree/shrub carrier, comprising:
   a plurality of side wall sections each configured so as to be arranged into a root ball container, each of said side wall sections being substantially identical in shape and having a side edge to be placed in juxtaposition to a side edge of an adjacent one of said side wall sections such that said container is generally shaped as a truncated pyramid having an open top and a smaller open bottom, and means for releasably securing said side edges of said side wall sections to form said root ball container; and
   means for releasably securing a tree/shrub root ball within said root ball container during carrier transport thereof operatively associated with at least said open top of said root ball container, said ball securing means including at least a pair of retention strap assemblies operatively associated with said open top of said root ball container, said retention strap assemblies each including a strap mount associated with one of said side wall sections and a strap retainer associated with another of said side wall sections to be positioned directly opposite thereof, said strap mounts each having one end of a strap permanently secured thereto and said strap retainers each being adapted to releasably grip one of said straps at a point remote from said permanently secured end thereof.

2. The reusable tree/shrub carrier of claim 1 wherein said side wall sections are generally planar and trapezoidal shaped, said side wall sections of said root ball container defining a generally continuous container wall formed of a rigid material.

3. The reusable tree/shrub carrier of claim 1 wherein said edge securing means includes a plurality of substantially identical corner locking channels, said corner locking channels being configured for sliding engagement with and interlocking retention of said side edges of said side wall sections.

4. The reusable tree/shrub carrier of claim 1 wherein said ball securing means also includes at least one retention strap assembly operatively associated with said open bottom of said root ball container.

5. The reusable tree/shrub carrier of claim 1 wherein said side wall sections include four substantially identical sections, said side wall sections each having a top edge formed to include a lifting rail configured for cooperation with an external lifting device.

6. A reusable tree/shrub carrier, comprising:
   four side wall sections each configured so as to be arranged into a root ball container, each of said side wall sections being generally planar and trapezoidal shaped to define a generally continuous container wall formed of a rigid material, each of said side wall sections also having a side edge to be placed in juxtaposition to a side edge of an adjacent one of said side wall sections such that said container is generally shaped as a truncated pyramid having a square open top and a smaller square open bottom, each of said side wall sections further having a top edge formed to include a lifting rail cooperable with an external lifting device, and means for releasably securing said side edges of said side wall sections to form said root ball container;

said edge securing means including a plurality of substantially identical corner locking channels configured for sliding engagement with and interlocking retention of said side edges of said side wall sections; and means for releasably securing a tree/shrub root ball within said root ball container during carrier transport thereof, said securing means being operatively associated with both said open top and said smaller open bottom of said root ball container, said ball securing means including at least a pair of retention strap assemblies operatively associated with said square open top and at least one retention strap assembly operatively associated with said square open bottom of said root ball container;

said retention strap assemblies each including a strap mount associated with one of said side wall sections and a strap retainer associated with another of said side wall sections to be positioned directly opposite thereof, said strap mounts each having one end of a strap permanently secured thereto and said strap retainers each being adapted to releasably grip one of said straps at a point remote from said permanently secured end thereof.

7. The reusable tree/shrub carrier of claim 6 wherein said corner locking channels each include a handle at one end thereof for sliding engagement and disengagement with said side edges of said side wall sections for assembly and disassembly of said root ball container.

8. The reusable tree/shrub carrier of claim 6 wherein said lifting rails each include a corner locking channel retainer thereon, said corner locking channels each being configured for sliding engagement with and frictional retention on one of said retainers.

9. The reusable tree/shrub carrier of claim 6 wherein said straps of said one pair of retention strap assemblies operatively associated with said square open top each are adapted to be extended across said square open top over said tree/shrub root ball in spaced parallel relation in a first direction.

10. The reusable tree/shrub carrier of claim 9 wherein another pair of retention strap assemblies operatively associated with said square open top each have a strap to be extended across said square open top over said tree/shrub root ball in spaced parallel relation in a second direction.

11. The reusable tree/shrub carrier of claim 6 wherein said strap of said one retention strap assembly operatively associated with said square open bottom of said root ball container is adapted to be extended across said square open bottom under said tree/shrub root ball in a first direction.

12. The reusable tree/shrub carrier of claim 11 wherein another retention strap assembly operatively associated with said square open bottom of said root ball container has a strap to be extended across said square open bottom under said tree/shrub root ball in a second direction.

13. The reusable tree/shrub carrier of claim 6 wherein said lifting rails are each open to facilitate insertion and removal of said external lifting device.

* * * * *